US012122618B1

(12) United States Patent
Ruffatto et al.

(10) Patent No.: US 12,122,618 B1
(45) Date of Patent: Oct. 22, 2024

(54) TRAY FLIPPER

(71) Applicant: Amazon Technologies, Inc., Seattle, WA (US)

(72) Inventors: Don Frank Ruffatto, Renton, WA (US); Emily Dunne, Arvada, CO (US); Ennio Claretti, Seattle, WA (US); Suvesha Chandrasekaran, Seattle, WA (US); Andrew Stubbs, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 399 days.

(21) Appl. No.: 17/703,482

(22) Filed: Mar. 24, 2022

(51) Int. Cl.
*B65G 47/91* (2006.01)
*B65G 47/34* (2006.01)

(52) U.S. Cl.
CPC ........... *B65G 47/914* (2013.01); *B65G 47/34* (2013.01); *B65G 2203/0216* (2013.01); *B65G 2203/041* (2013.01)

(58) Field of Classification Search
CPC .................. B65G 47/914; B65G 47/34; B65G 2203/0216; B65G 2203/041
See application file for complete search history.

(56) References Cited

U.S. PATENT DOCUMENTS

| 3,420,392 | A  | * | 1/1969 | Flint ..................... | F26B 25/001 |
| | | | | | 134/102.1 |
| 9,120,635 | B2 | * | 9/2015 | Su ........................ | B65G 47/252 |
| 9,492,926 | B2 | * | 11/2016 | Mattern ................. | B25J 9/0096 |
| 10,376,935 | B1 | * | 8/2019 | Cabrera .................... | B08B 9/34 |
| 10,906,188 | B1 | * | 2/2021 | Sun ............................. | B07C 5/36 |
| 11,407,587 | B1 | * | 8/2022 | Dwivedi ............. | B65G 1/0435 |
| 2005/0281662 | A1 | * | 12/2005 | Carey ................... | B65G 47/248 |
| | | | | | 198/395 |
| 2019/0344974 | A1 | * | 11/2019 | Wicks ................... | B65G 47/914 |
| 2020/0017317 | A1 | * | 1/2020 | Yap ......................... | G06Q 10/08 |
| 2020/0324982 | A1 | * | 10/2020 | Wiebe .................... | B65G 65/23 |
| 2020/0377307 | A1 | * | 12/2020 | Kinoshita .......... | B65G 47/1421 |
| 2021/0171291 | A1 | * | 6/2021 | Green ..................... | B65G 47/64 |
| 2022/0297160 | A1 | * | 9/2022 | Costanzo ............... | B65G 47/53 |
| 2022/0306402 | A1 | * | 9/2022 | Sun ......................... | B25J 9/0084 |
| 2022/0315351 | A1 | * | 10/2022 | Zheng ..................... | G07F 11/42 |
| 2022/0331841 | A1 | * | 10/2022 | Filler ............... | G06K 19/06037 |
| 2022/0340373 | A1 | * | 10/2022 | Wilkinson ........... | A21C 15/002 |

(Continued)

*Primary Examiner* — Saul Rodriguez
*Assistant Examiner* — Ashley K Romano
(74) *Attorney, Agent, or Firm* — Thomas | Horstemeyer, LLP

(57) ABSTRACT

Tray flipper automation tools are described. In one example, a tray flipper includes a flip arm positioned along a conveyor, a tamper arm, a drive system, and a controller. The controller is configured to detect alignment of a tray on the conveyor with the flip arm, direct the drive system to rotate the tamper arm to a position over the tray, and actuate a tamper plate of the tamper arm to secure contents in the tray. The controller is also configured to rotate the tamper arm and the flip arm, with the tray secured between them, to an inverted position off of the conveyor. Items positioned within the tray can be flipped over when the tamper arm and the flip arm rotate away from the conveyor. The flip arm and tray can then be rotated back, leaving the items resting on the tamper plate for inspection and materials handling steps.

20 Claims, 8 Drawing Sheets

(56) References Cited

U.S. PATENT DOCUMENTS

| | | | |
|---|---|---|---|
| 2023/0346151 A1* | 11/2023 | Shvets | A47J 27/004 |
| 2024/0017940 A1* | 1/2024 | Lovett | B65G 61/00 |
| 2024/0116717 A1* | 4/2024 | Woodrough, Jr. | B65G 47/38 |

* cited by examiner

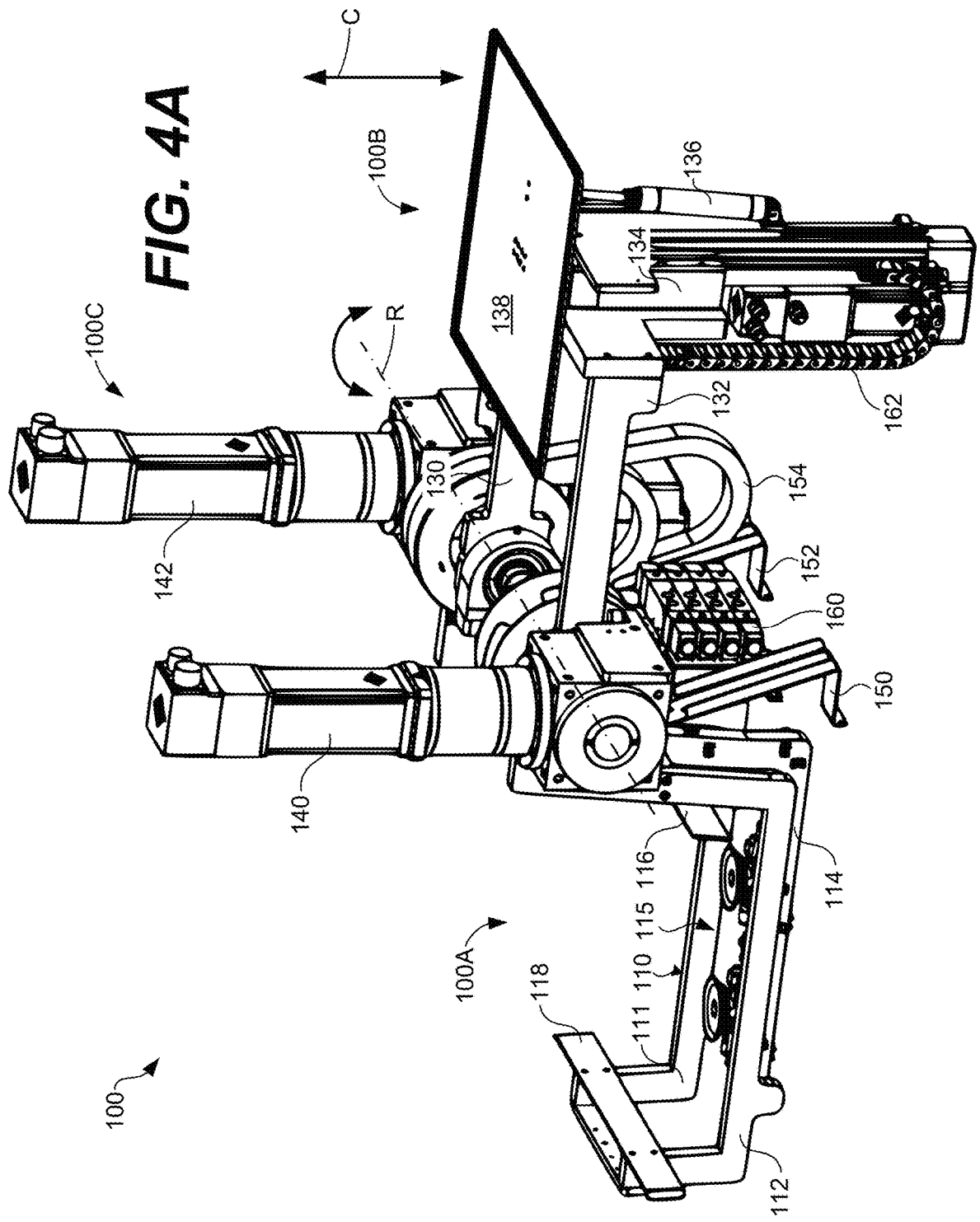

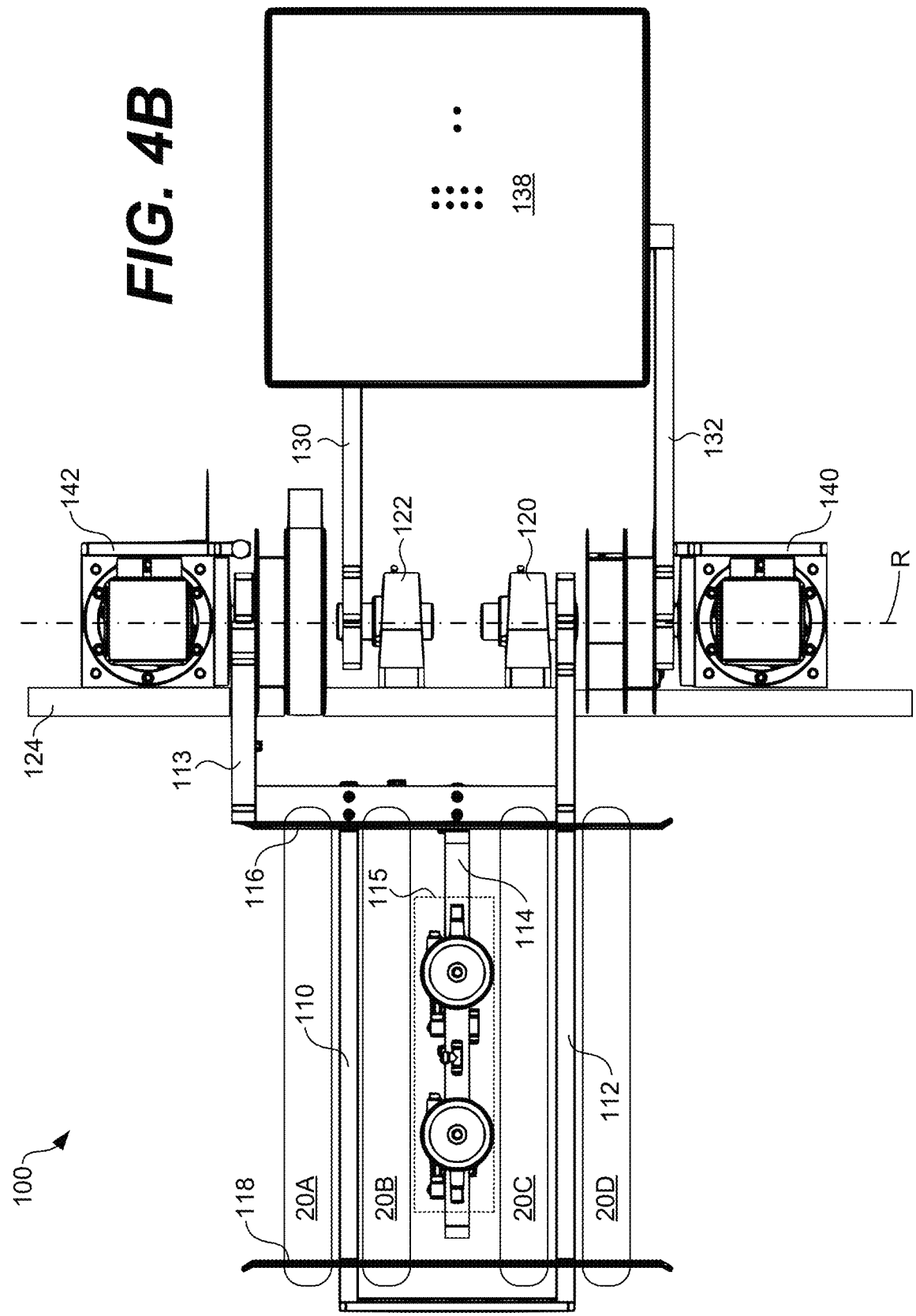

TRAY FLIPPER

BACKGROUND

Thousands of items, articles, or products can be stored at materials handling facilities. These items can be stored at many different locations in the materials handling facilities. When an order for a group of the items is received, it is necessary to gather all the items together to complete or fill the order. To that end, a number of items can be picked and transported along conveyors in trays, bins, cartons, or other containers for consolidation. The items can be organized or consolidated into groups of items that fulfill the order, for example, or for other reasons.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIG. 4A illustrates a perspective view of the tray flipper shown in FIG. 2 according to various aspects of the embodiments of the present disclosure.

FIG. 4B illustrates a top-down view of the tray flipper shown in FIG. 2 according to various aspects of the embodiments of the present disclosure.

DETAILED DESCRIPTION

As noted above, thousands of items, articles, or products can be stored at materials handling facilities. When an order for a group of the items is received, it is necessary to gather all the items together to complete or fill the order. To that end, a number of items can be picked and transported along conveyors in trays, bins, cartons, or other containers for consolidation. The items can be organized or consolidated into groups of items that fulfill the order, for example, or for other reasons.

Additionally, more and more items are being shipped by carriers to consumers. Thus, it has become more important to bring efficiency to the distribution chains through which these items are being transported. Additionally, it has become important to carefully track and monitor the schedules by which these items are consolidated and transported, to ensure compliance with the expectations of and commitments to the consumers. Because a great number of items are processed at and pass through materials handling facilities and sort centers, it would be helpful to further automate the transportation and consolidation of the materials handling processes in these facilities.

A number of different systems have been developed to help automate the consolidation of items in a materials handling facility or sort center. Conveyor systems, robotic automation machines, vacuum and gripping systems, and other systems have been designed to provide increased productivity through the automation of materials handling tasks. These systems are also particularly well-suited for dangerous, caustic, and extreme environments, where individuals are subject to discomfort or bodily harm.

Various aspects of tray flipper automation tools, systems, and methods are described herein. In one example, a tray flipper includes a flip arm positioned along a conveyor, a tamper arm, a drive system, and a controller. The controller is configured to detect alignment of a tray on the conveyor with the flip arm, direct the drive system to rotate the tamper arm to a position over the container, and actuate a tamper plate of the tamper arm to secure contents in the tray. The controller is also configured to rotate the tamper arm and the flip arm, with the tray secured between them, to an inverted position off of the conveyor. Items positioned within the tray can be flipped over when the tamper arm and the flip arm rotate away from the conveyor. The flip arm and tray can then be rotated back, leaving the items resting on the tamper plate for inspection and materials handling steps.

Figure 1:
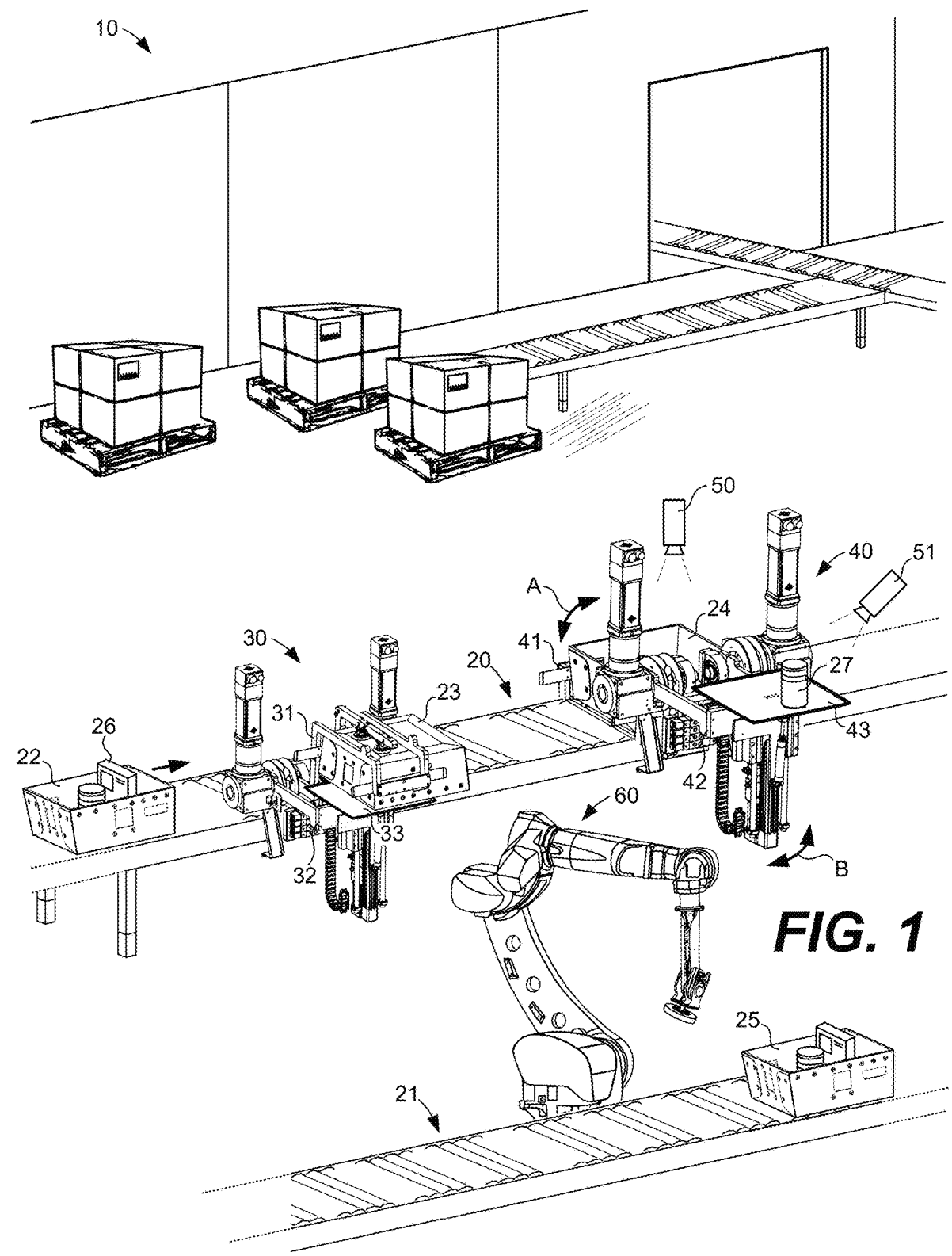
FIG. 1 illustrates an example materials handling facility according to various aspects of the embodiments of the present disclosure.

In the context outlined above, FIG. 1 illustrates an example materials handling facility 10 according to various aspects of the embodiments. Among other systems and components, the materials handling facility 10 includes a conveyor system 20, a conveyor system 21, a first tray flipper 30, a second tray flipper 40, a camera system including cameras 50 and 51, and a robotic arm 60. In the example shown, a number of bins or trays 22-24 are moving along the conveyor system 20. The tray flippers 30 and 40 are positioned along the conveyor system 20 and are capable of interacting with the trays 22-24. The conveyor system 20 can move or convey the bins or trays 22-24 along the conveyor system 20, such as from the left to the right of the page as shown. The items 26 are positioned within the tray 22. A tray 25 is also moving along the conveyor system 21.

The materials handling facility 10 is provided as an example environment or facility in which one or more tray flippers, such as the tray flippers 30 and 40, can be implemented to automate a number of materials handling processing steps. The tray flippers 30 and 40, among others, can be located at other positions within the materials handling facility 10 in other cases. The tray flippers 30 and 40 can be used in other types of materials handling environments. In practice, the tray flipping tools and systems described herein can be implemented at various locations within a materials handing or related facilities.

The tray flippers 30 and 40 are also representative in FIG. 1. The tray flippers 30 and 40 can be embodied as any of the example tray flippers described below in connection with FIGS. 2, 3A-3C, 4A, and 4B. Among other uses, the tray flippers 30 and 40 can be relied upon to help inspect, sort, transfer, consolidate, and process various items, such as the items 26, in the materials handling facility 10. Among other components described in further detail below, the tray flipper 30 includes a flip arm 31, a tamper arm 32, and a tamper plate 33 connected to the tamper arm 32. Similarly, the tray flipper 40 includes a flip arm 41, a tamper arm 42, and a tamper plate 43 connected to the tamper arm 42.

The operation of the tray flippers 30 and 40 is first described with reference to FIG. 1, and a more detailed description is provided below with reference to the remaining figures. Generally, the tray flippers 30 and 40 are capable of flipping or turning over bins or trays traveling along the conveyor system 20, including the bins or trays 22-24. The tray flippers 30 and 40 can also flip or turn over any items contained within the bins or trays 22-24, emptying them from the trays 22-24 with the assistance of gravity. Thus, the tray flippers 30 and 40 are able to empty the contents of the bins or trays 22-24, such as the items 26 in the tray 22, for example. Among other uses, the tray flippers 30 and 40 provide an automation tool for emptying the trays 22-24, as compared to the robotic arm 60, for example. The tray flippers 30 and 40 are one example of an automation tool, among potentially several others, that can be relied upon in the materials handling facility 10 to consolidate items and perform other materials handling tasks.

Turning to the tray flipper 40, the flip arm 41 is nested in the conveyor system 20, such as nested among or between rollers of the conveyor system 20. The tray 24 is positioned on the conveyor system 20 over the flip arm 41. The tray flipper 40 includes a drive system capable of rotating the flip arm 41 back and forth in the angular direction "A" shown in FIG. 1. The drive system is also capable of rotating the tamper arm 42 back and forth in the angular direction "B." To flip the tray 24 over, the tray flipper 40 can rotate the tamper arm 42 and the tamper plate 43 to a position over top of the tray 24. In that position, the tray flipper 40 can also actuate the tamper plate 43, to lower it down into the tray 24, securing any items within the tray 24. Once the tray 24 is secured between the flip arm 41 and the tamper plate 43, the tray flipper 40 can rotate both the flip arm 41 and the tamper plate 43, at the same time, over and off of the conveyor system 20. The result of this flipping movement is depicted by the state of the tray flipper 30 shown in FIG. 1.

Turning to the tray flipper 30, the tray 23 has been flipped over and is inverted (i.e., upside-down) by the tray flipper 30, as shown. When the tray 23 is flipped over, any items within the tray 23 will fall down and rest upon the tamper plate 33 of the tray flipper 30. The tray 23 is shown to be offset from the tamper plate 33 in FIG. 1, so that the tamper plate 33 is visible. In practice, however, the conveyor system 20 can be controlled to position the tray 23 into alignment with the tamper plate 33 of the tray flipper 30, before the tray 23 is flipped over by the tray flipper 30.

After items within the tray 23 fall and rest upon the tamper plate 33, then the tray flipper 30 can rotate the flip arm 31 back into a nested position between the rollers of the conveyor system 20, similar to that of the tray flipper 40. Any items that were previously contained within the tray 23 will remain resting upon the tamper plate 33 of the tray flipper 30. As described in further detail below, the flip arm 31 also includes an adhesion tool to secure the tray 23 to the flip arm 31, so that the tray 23 can be rotated back over and onto the conveyor system 20, leaving the contents of the tray 23 upon the tamper plate 33. An example of this is shown in FIG. 1, where the item 27 is resting upon the tamper plate 43 of the tray flipper 40. Items resting upon the tamper plate 33 or the tamper plate 43, such as the item 27, can be picked by the robotic arm 60 and placed into the tray 25 on the conveyor system 21, for example, or other actions can be taken to consolidate or further handle the item 27.

The tray flippers 30 and 40 are capable of carefully and completely flipping items over. Thus, the camera system, including the cameras 50 and 51, can capture images of items in the trays 22-24, as they are processed by the tray flippers 30 and 40. In one example, the camera 50 can capture images of the item 27 in the tray 24 before it is flipped over, and the camera 51 can capture images of the item 27 after it has been flipped over and onto the tamper plate 43 by the tray flipper 40. In this way, the tray flipper 40 can facilitate the manipulation of the item 27, for examining Uniform Product Code (UPC) bar codes or other information of the item 27. The use of additional cameras and camera systems for other purposes are within the scope of the embodiments, and examples are described below.

Figure 2:
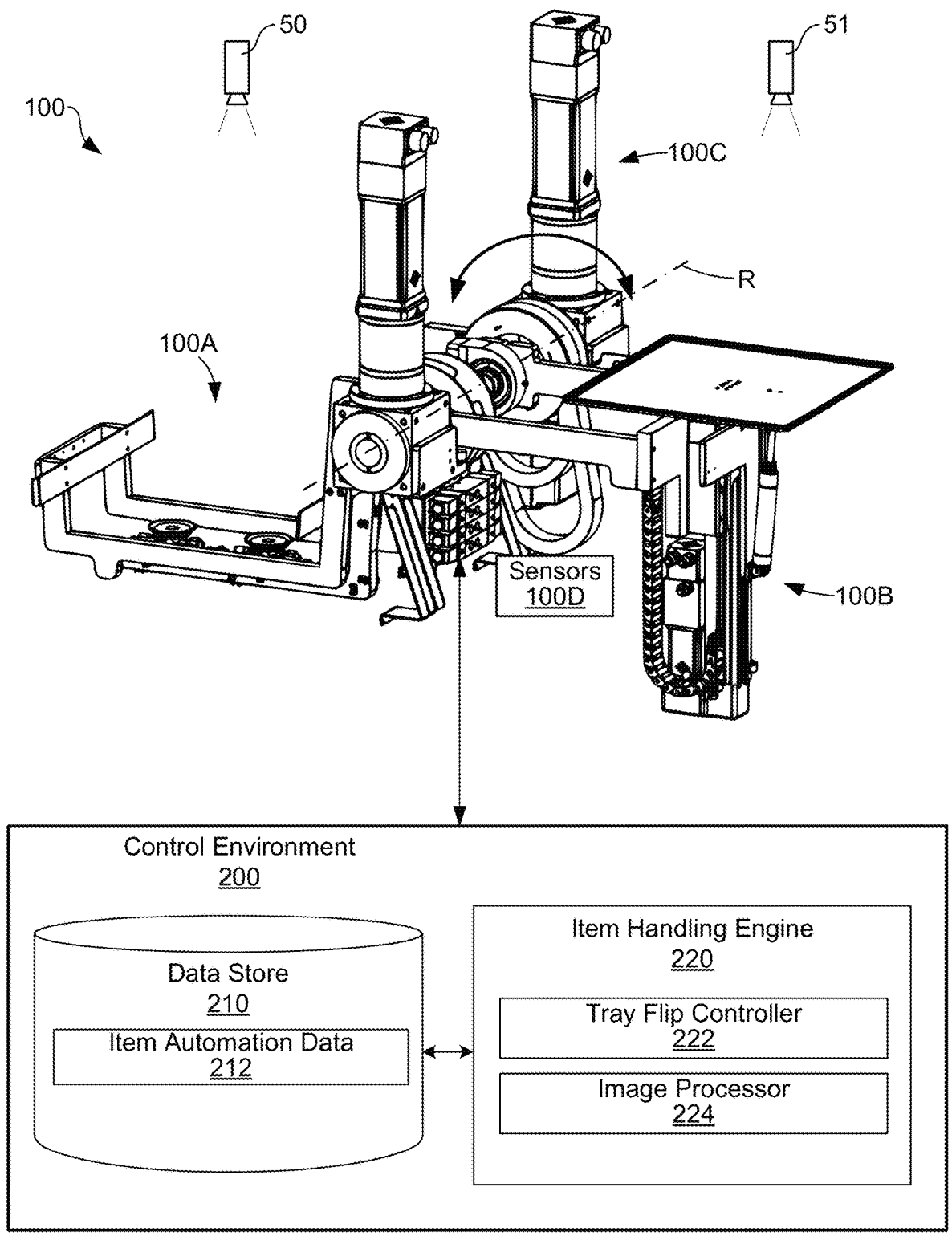
FIG. 2 illustrates a tray flipper and control environment according to various aspects of the embodiments of the present disclosure.

FIG. 2 illustrates a tray flipper 100, a control environment 200, and the cameras 50 and 51 according to various aspects of the embodiments of the present disclosure. The embodiment of the tray flipper 100 is provided as a representative example in FIG. 2. The tray flipper 100 is not necessarily drawn to any scale or size, and the relative sizes, shapes, and positions of the components of the tray flipper 100 can vary as compared to that shown. The tray flipper 100 can also be modified as compared to that shown, for the purpose of integration with a variety of systems in materials handling facilities, including conveyor systems, robotic pick and place automation machines, transport robots, and other systems.

The tray flipper 100 includes a flip arm 100A, a tamper arm 100B, a drive system 100C, and a number of sensors 100D, among possibly other components. The flip arm 100A, tamper arm 100B, and drive system 100C each includes an assembly of parts or components, and examples of those components are described in further detail below with reference to FIGS. 4A and 4B. The drive system 100C is mechanically coupled to pivot mounts for the flip arm 100A and the tamper arm 100B, and the drive system 100C can individually actuate both the flip arm 100A and the tamper arm 100B to rotate about the axis of rotation "R," as shown in FIG. 2. The drive system 100C can rotate both the flip arm 100A and the tamper arm 100B through 180° of motion about the axis of rotation "R," in some cases, although the range of motion can be greater or smaller in some cases. An overview of the operation of the tray flipper 100 is also described below with reference to FIGS. 3A-3C.

The control environment 200 can be embodied as a control system for the tray flipper 100, including one or more processors, processing devices, circuits, and memory devices. The control environment 200 can be implemented using a combination of hardware and software, for example, as described in further detail below with reference to FIG. 6. The control environment 200 can be implemented as an embedded control system of the tray flipper 100 itself (e.g., a programmable logic controller (PLC) of the tray flipper 100), implemented separate from the tray flipper 100, or be embodied as a hybrid of local and remote processing systems. The control environment 200 can also interface with the tray flipper 100 in any suitable way, such as through one or more local interfaces, network interfaces, or other suitable interfaces.

The cameras 50 and 51 can be embodied as cameras including charge-coupled device (CCD) image sensors, active-pixel complimentary metal-oxide semiconductor (CMOS) image sensors, or other image sensors capable of capturing images. The positions of the cameras 50 and 51 are provided as a representative example in FIG. 2, as the cameras 50 and 51 can be located at other locations or positions around the tray flipper 100. The positions of the cameras 50 and 51 can be selected to facilitate the best view of items contained within bins or trays processed by the tray flipper 100. Generally, the camera 50 is positioned to capture images of items over the flip arm 100A, and the camera 51 is positioned to capture images of items over the tamper arm 100B. In some cases, both the camera 50 and the camera 51 can be embodied as an array of cameras, to ensure that images of all sides and surfaces of items can be captured.

The control environment 200 is configured to direct the overall operation of the tray flipper 100 in the automated handling of items. In that sense, the control environment 200 is configured to direct the operation of the drive system 100C to rotate the flip arm 100A and the tamper arm 100B, among other operational aspects of the tray flipper 100 described herein. In some cases, the control environment 200 can coordinate the operation of other tray flippers in addition to the tray flipper 100. The control environment 200 can also be configured to direct the operation of the cameras 50 and 51, among others.

The control environment 200 includes a data store 210 and an item handling engine 220. The data store 210 can store operational data for the tray flipper 100, including data processed by the item handling engine 220. For example, the data store 210 can also store item automation data 212, among other types of data. The item automation data 212 can include data related to items being handled at the materials handling facility 10 in FIG. 1, such as item description data, item identification data (e.g., barcode, UPC, serial number, model number, sales price, and related data), item quality data (e.g., size, weight, hazardous materials, and other data), and other information. The item automation data 212 can also include images of the items being handled, along with routing, consolidation, and order data, and any other data relevant to the automation processes being performed by the tray flipper 100. The data store 210 can also store images captured by the cameras 50 and 51, among others, for image analysis and processing.

The item handling engine 220 includes a tray flip controller 222 and an image processor 224. The tray flip controller 222 is configured to monitor the operational conditions and state of the tray flipper 100 and direct the drive system 100C to rotate the flip arm 100A and the tamper arm 100B, respectively, among other operational aspects. To that end, the tray flip controller 222 can incorporate control algorithms suitable to direct the operation of the drive system 100C. Those algorithms can be relied upon to control motor drive systems, pneumatic drive systems, and other drive systems in the tray flipper 100. As examples, the tray flip controller 222 can incorporate proportional-integral (PI) or proportional-integral-derivative (PID) control loop systems or algorithms employing feedback, among other suitable control approaches.

The tray flip controller 222 can also control other components of the tray flipper 100. For example, as described in further detail below, the flip arm 100A can also include an adhesion tool capable of securing a bin or tray with the flip arm 100A. Additionally, the tamper arm 100B can include a linear actuator capable of moving a tamper plate. The tray flip controller 222 can also direct or control the operations of those components as described below.

The tray flip controller 222 can use data provided from the sensors 100D, which are described in further detail below, to help direct the operations of the tray flipper 100. For example, the sensors 100D can provide control signals that identify whether or not a bin or tray is aligned with the tray flipper 100, for inverting or flipping the bin or tray. The sensors 100D can also identify the absolute or relative positions (e.g., angular positions) of the flip arm 100A and the tamper arm 100B, respectively, the speed at which the flip arm 100A and the tamper arm 100B are moving, and other operational conditions of the tray flipper 100.

The sensors 100D can be embodied as one or more optical sensors, interference sensors, position encoders, pressure sensors, proximity sensors, contact sensors, other sensors, or a combination thereof, capable of providing operational state feedback signals to the control environment 200. Data obtained from the feedback signals can be stored in the data store 210 for further evaluation and processing by the item handling engine 220. The sensors 100D can be placed in, on, and around various components of the tray flipper 100, including around the flip arm 100A, the tamper arm 100B, and the drive system 100C.

As one example, the sensors 100D can include one or more pressure, contact, optical, or vision-based sensors installed in or around the flip arm 100A (including in or on the conveyor system), to detect the presence of a bin or tray over the flip arm 100A. In other examples, the sensors 100D can be embodied as position encoders that provide absolute or relative positions information of the flip arm 100A and the tamper arm 100B, respectively, for evaluation by the control environment 200. The control environment 200 can direct the operations of the tray flipper 100, at least in part, based on the operational state feedback signals provided from the sensors 100D.

The image processor 224 can operate in connection with the tray flip controller 222, to capture images of items being handled by the tray flipper 100. For example, the image processor 224 can direct the camera 50 to capture images of items before the tray flipper 100 handles (e.g., flips or inverts) the items. Similarly, the image processor 224 can also direct the camera 51 to capture images of items after the tray flipper 100 has flipped or inverted the items over. In some cases, the image processor 224 can be separate from the rest of the control environment 200, and the item handling engine 220 can be interfaced with the image processor 224 to the extent necessary to coordinate the operations described herein.

Figure 3A:
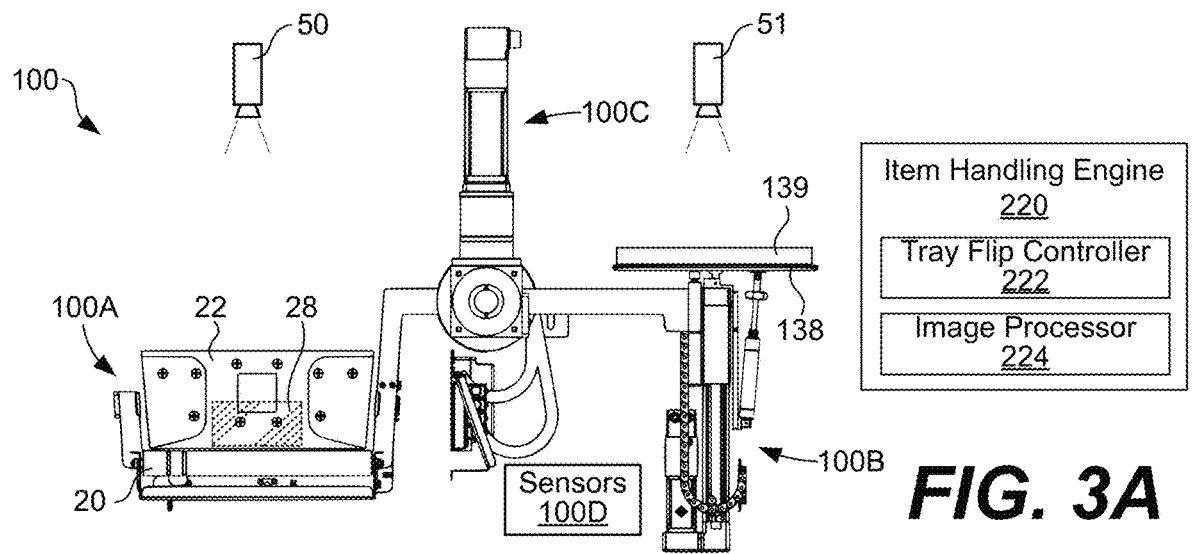
FIG. 3A illustrates a side view of the tray flipper shown in FIG. 2, in a first configuration, according to various aspects of the embodiments of the present disclosure.
Figure 3B:
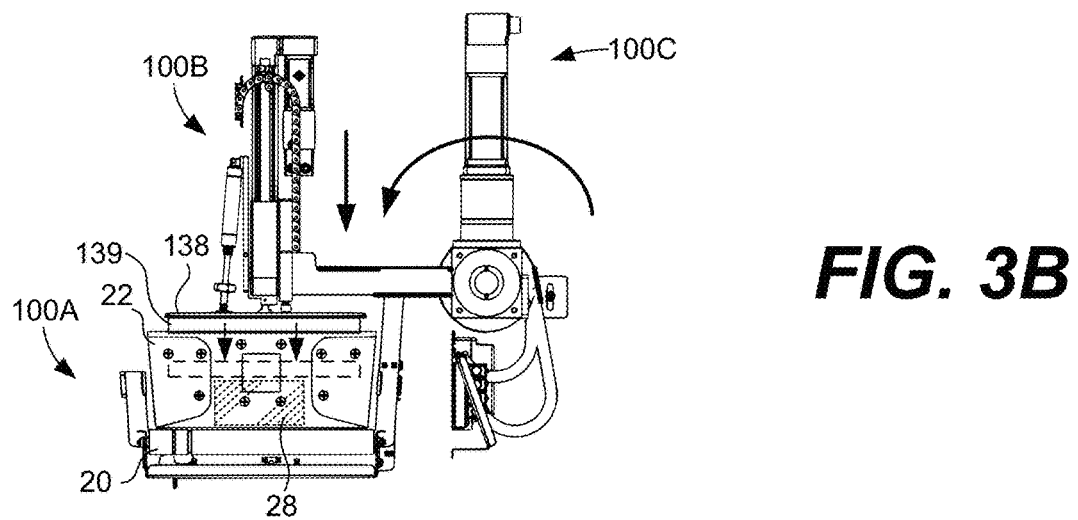
FIG. 3B illustrates a side view of the tray flipper shown in FIG. 2, in a second configuration, according to various aspects of the embodiments of the present disclosure.
Figure 3C:
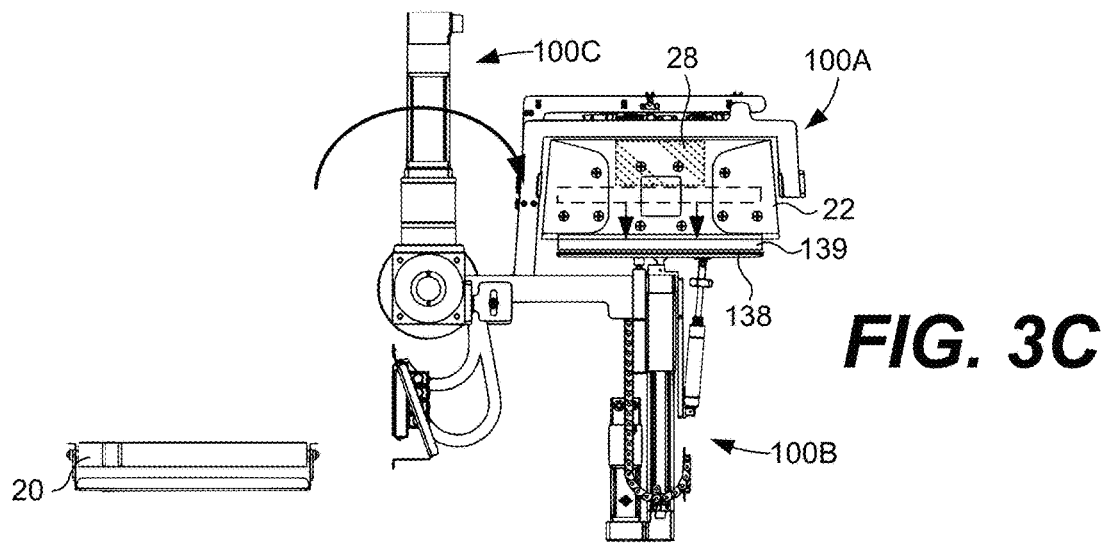
FIG. 3C illustrates a side view of the tray flipper shown in FIG. 2, in a third configuration, according to various aspects of the embodiments of the present disclosure.

Turning to the operation of the tray flipper 100, FIG. 3A illustrates a side view of the tray flipper 100 in a first configuration, FIG. 3B illustrates the tray flipper 100 in a second configuration, and FIG. 3C illustrates the tray flipper 100 in a third configuration. The tray flipper 100 is in an open configuration in FIG. 3A, with the flip arm 100A in a nested position between or among rollers of the conveyor system 20 (see also FIG. 4B). The tray 22 is also positioned on the conveyor system 20 and over the flip arm 100A. In some cases, a mechanical stop, armature, or other mechanical interference can be relied upon to stop the tray 22 at the position shown in FIG. 3A, with the tray 22 positioned centrally over the flip arm 100A. In other cases, the conveyor system 20 can be controlled to stop the tray 22 at the position shown in FIG. 3A, or other suitable means or methods can be used to stop or position the tray 22.

The tray 22 can include one or more items, such as the item 28, positioned within the tray 22. According to the concepts described herein, the tray flipper 100 can flip over and invert the tray 22, with the item 28 secured or contained within the tray 22. The item 28 will also be inverted and flipped over along with the tray 22 by the tray flipper 100. The camera system, including the cameras 50 and 51, can capture images of the item 28, as it is handled by the tray flipper 100. In one example, the image processor 224 can direct the camera 50 to capture images of the item 28 in the tray 22 before it is flipped over. Additionally, the image processor 224 can direct the camera 51 to capture images of the item 28 after it has been flipped over onto the tamper arm 100B. In this way, the tray flipper 100 can facilitate the manipulation of the item 28 for image capture, which can be helpful for examining UPC bar codes or other tasks. The tray flipper 100 can also flip over the tray 22 and the item 28 for other materials handling purposes or reasons.

To start, the item handling engine 220 can detect the alignment of the tray 22 with the flip arm 100A in the configuration shown in FIG. 3A. For example, the item handling engine 220 can receive operational state feedback signals from the sensors 100D, such as from one or more optical sensors, interference sensors, proximity sensors, contact sensors, or other sensors, to detect or identify that the tray 22 is aligned with the flip arm 100A. In this state, the image processor 224 can direct the camera 52 to capture images of the item 28 in the tray 22. The tray flip controller 222 can also make any calculations, such as calculations for timing, coordination, or synchronization control of the flip arm 100A, the tamper arm 100B, or other components or systems at this time. Overall, the tray flip controller 222 is configured to prepare the tray flipper 100 for transition to the second configuration shown in FIG. 3B.

From the open configuration in FIG. 3A, the item handling engine 220 can direct the drive system 100C to rotate the tamper arm 100B to a position over the tray 22. In the example shown in FIG. 3B, the item handling engine 220 can control the drive system 100C to rotate the tamper arm 100B in the counter-clockwise direction, so that it is positioned over the tray 22. In this arrangement, the tamper plate 138 of the tamper arm 100B is positioned above the top opening of the tray 22.

The tamper plate 138 can also include a block of foam 139 secured or adhered to an exterior surface of the tamper plate 138 as shown in FIGS. 3A-3C. The block of foam 139 can be any suitable type of foam of any suitable thickness. In one example, the block of foam 139 can be embodied as a 1 inch thick block of relatively soft foam, although other thicknesses of foam can be relied upon. A relatively soft foam can be helpful to prevent damage to any items in the tray 22 and to help prevent any items from rolling off of the tamper plate 138, after items are inverted over and upon the tamper plate 138 as described below. In some cases, the foam 139 can include a sheet or lining on its top surface. The sheet or lining can have a relatively low coefficient of friction, so that items can slide off the tamper plate 138 for further item handling, as shown in FIG. 3E, for example.

When the tamper arm 100B is in the position shown in FIG. 3B, the item handling engine 220 can also direct or actuate the tamper arm 100B to extend the tamper plate 138 down into the tray 22. The tamper arm 100B can include a linear actuator capable of extending the tamper plate 138 down into the tray 22, as shown in FIG. 3B. The item handling engine 220 can extend the tamper plate 138 down until contact is made with a surface of the item 28, based on feedback using sensors or the linear actuator of the tamper arm 100B. In this way, the item 28 can be secured in place with sufficient contact and pressure, without crushing or damaging the item 28. The tamper arm 100B contacts the item 28 using the tamper plate 138 using sufficient force to hold the item 28 for inversion, without using forces that might damage the item 28.

The item handling engine 220 can also engage an adhesion tool to secure the tray 22 with the flip arm 100A. As described in further detail below, the flip arm 100A includes an adhesion tool, such as one or more vacuum or suction cups. The adhesion tool can be controlled by the item handling engine 220 to grip, grab, or grasp the tray 22 and hold it in connection with the flip arm 100A.

After the tamper arm 100B has secured the item 28 in the tray 22, and the adhesion tool has secured the tray 22 with the flip arm 100A, then the item handling engine 220 can proceed to flip or invert the tray 22 and the item 28 over, as shown in the transition between FIG. 3B and FIG. 3C. Particularly, the item handling engine 220 can direct the drive system 100C to rotate both the flip arm 100A and the tamper arm 100B, with the tray 22 secured between them, to an inverted position off of the conveyor system 20. The drive system 100C can rotate both the flip arm 100A and the tamper arm 100B in a clockwise direction to arrive at the position shown in FIG. 3C.

The item handling engine 220 can now direct the tamper arm 100B to retract or withdraw the tamper plate 138 down and out of the tray 22, using the linear actuator of the tamper arm 100B, as shown in FIG. 3B. In this way, the item 28 can be carefully withdrawn and separated from the tray 22. The linear actuator can move slowly enough so as not to disturb the item 28, such as causing it to roll or pitch. Also, the foam 139 can cushion or cradle the item 28, as it is lowered, helping to prevent the item 28 from rolling or repositioning as it is withdrawn from the tray 22. The tamper arm 100B can also incorporate mechanical components that permit the tamper plate 138 to have one or two degrees of freedom, as described in further detail below.

Figure 3D:
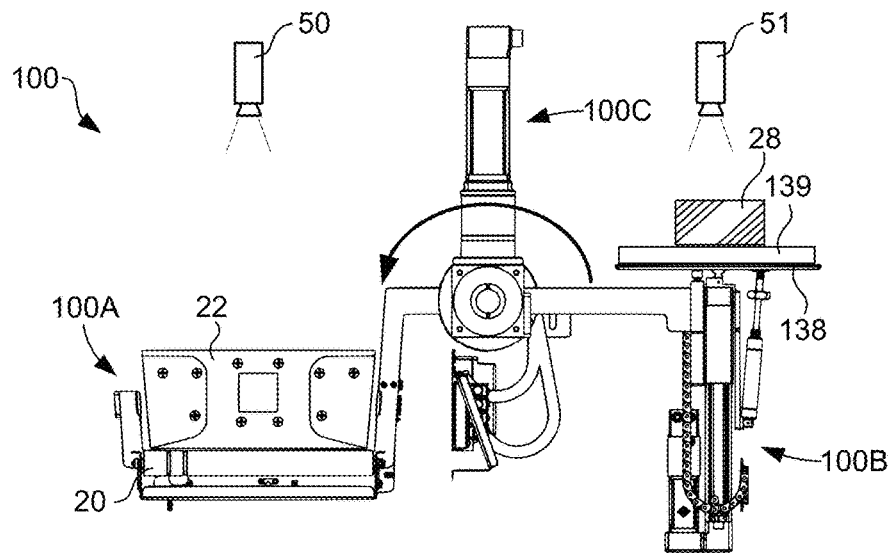
FIG. 3D illustrates a side view of the tray flipper shown in FIG. 2, rotated back to the first configuration, according to various aspects of the embodiments of the present disclosure.
Figure 3E:
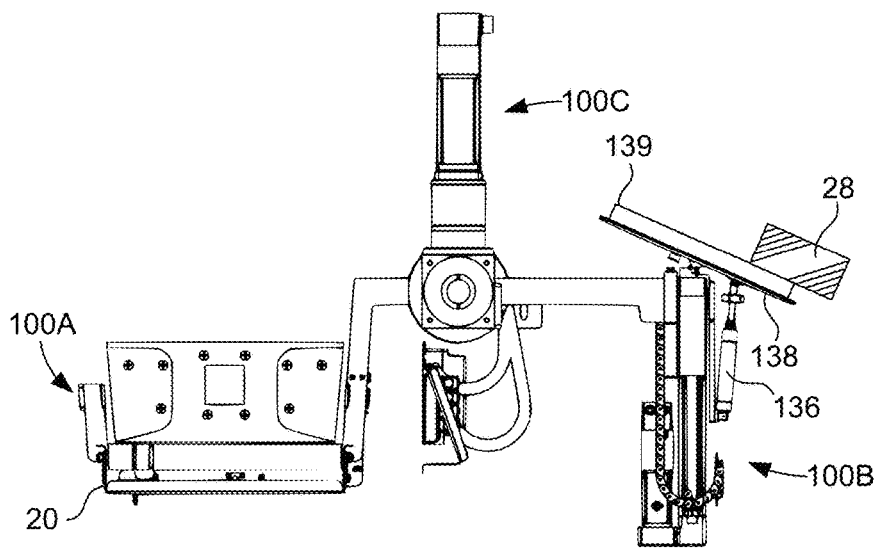
FIG. 3E illustrates a side view of the tray flipper with a pivoted tamper plate to slide an item off the tamper plate according to various aspects of the embodiments of the present disclosure.

FIG. 3D illustrates a side view of the tray flipper 100, after the flip arm 100A has been rotated back to the first configuration. Here, the item handling engine 220 can direct the drive system 100C to rotate the flip arm 100A, with the tray 22 secured to the flip arm 100A by the adhesion tool, back to the upright position over the conveyor system 20. In this process, the item handling engine 220 removes the tray 22 from over the item 28, leaving the item 28 resting upon the tamper plate 138 as shown. Images of the item 28 can now be captured using the camera 51, and the image processor 224 can direct the camera 51 to capture the images. Because images were also captured by the camera 50 before the item 28 was flipped over, images of the item 28 can be captured from all sides. In other words, a full examination of the item 28 can be conducted using the cameras 50 and 51, among possibly others, with the assistance of the tray flipper 100. The tray flipper 100 can also be relied upon to assist with other materials handling tasks, such as manipulating items (e.g., turning items over), repositioning items, and inspecting items.

The item handling engine 220 can also control the adhesion tool to release the tray 22, so that it can continue along the conveyor system 20. Alternatively, rather than the tray 22 continuing along the conveyor system 20 empty, the process described above can be reversed to put the item 28 back into the tray 22. That is, the flip arm 100A and the tray 22 can be rotated back over the tamper arm 100B, covering the item 28, which is resting on the tamper plate 138. The tamper arm 100B can then be actuated to move and extend the tamper plate 138 and item 28 up into the tray 22, so that it is secured against the bottom or base of the tray 22. Then, the drive system 100C can rotate the flip arm 100A and the tamper arm 100B back to the orientation shown in FIG. 3B, and the tamper arm 100B can be rotated back, leaving the item 28 in the tray 22. These and other operational aspects of the tray flipper 100 are described below.

FIG. 3E illustrates a side view of the tray flipper 100, with the tamper plate 138 being pivoted to slide the item 28 off of the tamper plate 138. Here, the item handling engine 220 can direct an extension arm 136 to retract or pull a certain length, which pivots the tamper plate 138. The extension arm 136 is secured at one end to an exterior surface about the linear actuator 134 and at another end to an underside of the tamper plate 138. The tamper plate 138 can also be secured at the end of the linear actuator 134 through a coupling that offers a degree of freedom (e.g., a pivot axis). Thus, the tamper plate 138 can tilt, as shown in FIG. 3E, based on retraction by the extension arm 136. The item 28 can then slide off of the foam 139 and the tamper plate 138. The item 28 can slide into another tray, a chute, or another item handling system for further examination, transport, consolidation, or other handling processes.

The extent of the retraction by the extension arm 136 can be defined as part of the control algorithm of the item handling engine 220, to define the tilt angle of the tamper plate 138. For example, the extension arm 136 can retract to provide a tilt angle of between 20 to 60 degrees as compared to the level or horizontal state of the tamper plate 138 shown in FIG. 3D. The tamper plate 138 can also tilt back to being level based on extension of the extension arm 136.

FIG. 4A illustrates a perspective view of the tray flipper 100 shown in FIG. 2, and FIG. 4B illustrates a top-down view of the tray flipper 100. The embodiment of the tray flipper 100 is provided as a representative example in FIGS. 4A and 4B. The tray flipper 100 is not necessarily drawn to any scale or size, and the relative sizes, shapes, and positions of the components of the tray flipper 100 can vary as compared to that shown. The tray flipper 100 can also be modified as compared to that shown, for the purpose of integration with a variety of systems in materials handling facilities, including conveyor systems, robotic pick and place automation machines, transport robots, and other systems. The tray flipper 100 can also include other components or parts that are not shown in FIGS. 4A and 4B, and the tray flipper 100 can omit one or more of the components shown.

Referring between FIGS. 4A and 4B, the flip arm 100A includes a first carriage arm 110, a second carriage arm 112, a tool support bar 114, an adhesion tool 115, a first cross-bumper bar 116, and a second cross-bumper bar 118, among possibly other components. The carriage arms 110 and 112 are "J" or "U" shaped in profile (see also FIGS. 3A-3C), to cradle and support bins or trays. The carriage arms 110 and 112 extend parallel to each other and are thin enough to fit or nest between the individual rollers 20A-20D of the conveyor system 20A, as shown in FIG. 4B.

When the carriage arms 110 and 112 are nested between the rollers 20A-20D, as also shown in FIG. 3A, the top surface 111 of the carriage arm 110 can be positioned just below the top surfaces of the rollers 20A-20D, such that any bin or tray on the conveyor system 20 does not mechanically interfere with the top surface 111 of the carriage arm 110. However, the clearance can be slim or small, such as between one sixteenth and one quarter of an inch, for example.

The cross-bumper bars 116 and 118 are secured to and between the carriage arms 110 and 112 and extend parallel to the carriage arms 110 and 112. The cross-bumper bars 116 and 118 do not nest between or among the rollers 20A-20D, even when the flip arm 100A is resting in the position shown in FIG. 3A. Instead, the cross-bumper bars 116 and 118 are positioned above the rollers 20A-20D of the conveyor system 20 as shown in FIG. 3A. The cross-bumper bars 116 and 118 are positioned to bump or rest against the sides of a bin or tray. The cross-bumper bars 116 and 118 can be secured to the carriage arms 110 and 112 using mechanical fasteners (e.g., screws, bolts, nuts, pins, rivets, etc.), welds, adhesives, mechanical interferences, and other solutions of suitable strength. Additional plates, bars, and linkages can be secured between and among the carriage arms 110 and 112 and the cross-bumper bars 116 and 118, including the support arm 113, which is described below. The cross-bumper bars 116 and 118, carriage arms 110 and 112, and support arm 113 can be formed from aluminum or other metals, plastics, wood, or other suitable materials or combinations thereof.

The carriage arms 110 and 112 are mechanically coupled at one side to the drive system 100C, so that the drive system 100C can rotate the flip arm 100A about the axis of rotation "R," as shown in FIG. 4A. Referring to FIG. 4B, the support arm 113 is mechanically coupled to the drive mechanism 142. The support arm 113 is, in turn, mechanically coupled to the carriage arms 110 and 112. In turn, the carriage arm 112 is secured to the pivot mount 120, which also permits the carriage arm 112 to rotate about the axis of rotation "R." The pivot mount 120 can include a bearing or other assembly to facilitate the rotational movement.

The adhesion tool 115 can be embodied as one or more tools or mechanisms to adhere, grab, or otherwise secure bins or trays with the flip arm 100A. The adhesion tool 115 can be implemented as one or more electro-adhesion tools, dry adhesive tools (e.g., "sticky" position-able and reposition-able adhesive surfaces), vacuum cups, or other tools capable of adhering to the outer bottom surface of bins or trays. In any case, the tray flip controller 222 can control the adhesion tool 115 to selectively adhere to or release from the bottom surface of bins or trays. In other examples, the cross-bumper bars 116 and 118 can be mechanized with motors, linear actuators, solenoids, or other electro-mechanical components capable of grabbing or pressing against the sides of a bins or trays, to secure the bins or trays with the flip arm 100A.

In the example shown in FIGS. 4A and 4B, the adhesion tool 115 includes two vacuum cups, and the tray flip controller 222 can control the adhesion tool 115 to selectively adhere to or release from the bottom surface of bins or trays. The gripping or adhering strength of the adhesion tool 115 should preferably be sufficient to support the weight of bins or trays being inverted by the tray flipper 100, along with the accompanying inertial forces presented during acceleration. For example, the adhesion tool 115 should be capable of holding the tray 22 as the flip arm 100B rotates from the position in FIG. 3B to that in FIG. 3A.

The tamper arm 100B includes a first support leg 130, a second support leg 132, a linear actuator 134, an extension arm 136, and a tamper plate 138, among other components. The linear actuator 134 is supported and secured at one end of the support legs 130 and 132. The support legs 130 and 132 are also mechanically coupled to the drive system 100C at the other end, so that the drive system 100C can rotate the tamper arm 100B about the axis of rotation "R," as shown in FIG. 4A. Referring to FIG. 4B, the support leg 132 is mechanically coupled to the drive mechanism 140. The support leg 132 is secured to the pivot mount 122, which also permits the support leg 132 to rotate about the axis of rotation "R." The pivot mount 122 can include a bearing or other assembly to facilitate the rotational movement.

The linear actuator 134 can be embodied as a hydraulic, pneumatic, electro-mechanical, or other type of linear actuator. The linear actuator 134 is capable of moving or displacing the tamper plate 138 in the linear direction "C," as shown in FIG. 4A. In one example, the linear actuator 134 is capable of converting rotary motion into linear motion in the direction "C" using a leadscrew, ball screw, roller screw, cam, or other mechanical motion translation mechanism. In any case, the tray flip controller 222 can control the operation of the linear actuator to reposition the tamper plate 138 in the linear direction "C."

The tamper plate 138 can be secured at the end of the linear actuator 134 in various ways. In one example, the tamper plate 138 can be rigidly secured at the end of the linear actuator 134, without any ability to bend or pivot. In this case, the top surface of the tamper plate 138 will always extend perpendicular to the linear direction "C." In other examples, the tamper plate 138 can be secured at the end of the linear actuator 134 through a coupling that offers a degree of freedom in one or more directions. The top surface of the tamper plate 138 can tilt or offset to some extent, as compared to the linear direction "C," in that case. The coupling can permit movement (e.g., pivoting) in only one direction, using a pivot mount with a single axis of rotation. The coupling can permit relatively free movement, such as the type of movement permitted by a ball and socket joint, in another example. Permitting the tamper plate 138 to pivot can assist with securing items within the bins or trays.

The extension arm 136 is secured at one end to an exterior surface about the linear actuator 134 and at another end to an underside of the tamper plate 138. The extension arm 136 can be embodied as a damper, such as a gas spring, elastic, or another type of damper in one example. The extension arm 136 can dampen movement of the tamper plate 138, particularly if the tamper plate 138 is secured to the linear actuator 134 using a mount that permits movement or pivoting. The extension arm 136 can also function as a type of linear actuator in some cases, such as a hydraulic, pneumatic, electro-mechanical, or other type of linear actuator, controlled by the item handing engine 220. The extension arm 136 can be actuated (e.g., extended or retracted) to pivot the tamper plate 138, allowing items to slip or slide off the tamper plate 138. The extension arm 136 can be omitted in some cases.

The drive system 100C includes the drive mechanism 140 and the drive mechanism 142, among possibly others. The drive mechanisms 140 and 142 can be embodied as pneumatic, electro-mechanical, or other types of drive mechanisms. In one example, the drive mechanisms 140 and 142 can be embodied as motors, with or without gearboxes, capable of rotating the flip arm 100A and the tamper arm 100B. The drive mechanisms 140 and 142 can be oriented in alternative positions as compared to that shown in FIG. 4A, such as extending down, sideways, or in other directions. The drive mechanisms 140 and 142 can also include position sensors, weight or force sensors, and other sensors capable of providing operational and status feedback to the item handling engine 220.

The tray flipper 100 can also include other components, such as the brackets 150 and 152 and the cable raceway 154. In some cases, the tray flipper 100 can also include other supporting or peripheral equipment, such as the pneumatic pump equipment 160 and the cabling or tubing raceway 162. The tamper plate 138 can also include a block of foam, such as the foam 139 shown in FIGS. 3A-3C, that is secured or adhered to the top surface of the tamper plate 138. The block of foam can be any suitable type of foam of any suitable thickness. In one example, the block of foam can be embodied as a 1 inch thick block of relatively soft foam, although other thicknesses of foam can be relied upon. A relatively soft foam can be helpful to prevent damage to any items in bins or trays and help to prevent any items from rolling off of the tamper plate 138, after items are inverted over and upon the tamper plate 138.

Referring to FIG. 4B, the tray flipper 100 can be secured to any suitable mounting surface, such as plates or barriers positioned on or around the conveyor system 20. An example mounting surface 124 is shown in FIG. 4B. Among other components of the tray flipper 100, one or more of the pivot mounts 120 and 122 and the drive mechanisms 140 and 142 can be mechanically secured to the mounting surface 124 to secure it in place.

Figure 5:
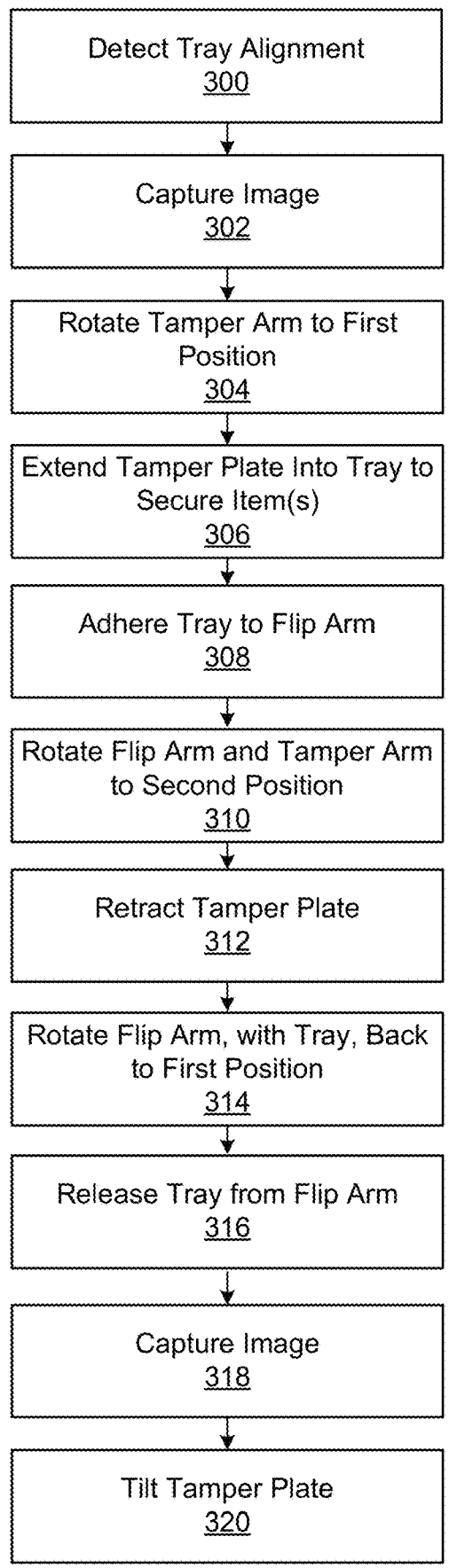
FIG. 5 illustrates an example method of flipping an item using the tray flipper shown in FIG. 2 according to various aspects of the embodiments of the present disclosure.

FIG. 5 illustrates an example method of flipping an item using the tray flipper shown in FIG. 2 according to various aspects of the embodiments of the present disclosure. The process shown in FIG. 5 is described in connection with the tray flipper 100 shown in FIGS. 3A-3C, 4A, and 4B, although similar tray flippers and systems can perform the process. Although the process diagram shows an order of operation, the order can differ from that which is shown. For example, the order of two or more steps can be switched relative to the order shown or as described below. Also, two or more steps shown in succession can be executed concurrently or with partial concurrence. Further, in some examples, one or more of the steps can be skipped or omitted, and the process can continue on with additional steps for any period of time.

At step 300, the process includes detecting alignment of a tray on a conveyor system with a flip arm of a tray flipper. Referring to FIG. 3A for an example, the sensors 100D can provide control signals to the item handling engine 220. The sensors 100D can include one or more pressure, contact, optical, vision-based, or other sensors installed in or around the flip arm 100A, to detect the presence of a bin or tray over the flip arm 100A. The control signals can identify whether or not a bin or tray, such as the tray 22, is aligned with the tray flipper 100, and this feedback information can be provided to the item handling engine 220.

At step 302, the process includes capturing an image of the contents in the tray, while the tray is resting on the conveyor system. Here, the image processor 224 can direct the camera 50 to capture one or more images of the item 28 in the tray 22 before it is flipped over. The images captured can be used to examine UPC bar codes or other information of the item 28, as described herein.

At step 304, the process includes rotating a tamper arm to a first position over the tray and a flip arm. Here, the item handling engine 220 can direct the drive system 100C of the tray flipper 100 to rotate the tamper arm 100B to a position over the tray 22, as shown in FIG. 3B. The item handling engine 220 can control the drive system 100C to rotate the tamper arm 100B in the counter-clockwise direction, so that it is positioned over the tray 22. In this arrangement, the tamper plate 138 of the tamper arm 100B is positioned above the top opening of the tray 22.

At step 306, the process includes extending a tamper plate into the tray, to secure contents in the tray. For example, when the tamper arm 100B is in the position shown in FIG. 3B, the item handling engine 220 can direct or actuate the linear actuator 134 of the tamper arm 100B to extend the tamper plate 138 down into the tray 22. The item handling engine 220 can extend the tamper plate 138 down until contact is made with a surface of the item 28, for example. In this way, the item 28 can be secured in place with sufficient contact and pressure, without crushing or damaging the item 28.

At step 308, the process includes adhering the tray with the flip arm. For example, the item handling engine 220 can engage the adhesion tool 115 to secure the tray 22 to the flip arm 100A. The adhesion tool can be controlled by the item handling engine 220 to grip, grab, or grasp the tray 22 using suction, for example, to hold or secure the tray 22 with the flip arm 100A.

At step 310, the process includes rotating the tamper arm and the flip arm together, with the tray secured between them, to a second position. For example, the item handling engine 220 can flip or invert the tray 22 and the item 28 over. Particularly, the item handling engine 220 can direct the drive system 100C to rotate both the flip arm 100A and the tamper arm 100B, with the tray 22 secured between them, to an inverted position off of the conveyor system 20, as shown in the transition between FIGS. 3B and 3C. The drive system 100C can rotate both the flip arm 100A and the tamper arm 100B in a clockwise direction to arrive at the position shown in FIG. 3C.

At step 312, the process includes retracting the tamper plate from the tray, with the contents from the tray resting on the tamper plate, after rotating the tamper arm and the flip arm. For example, the item handling engine 220 can now direct the linear actuator 134 to withdraw or retract the tamper plate 138 out of the tray 22, as shown in FIG. 3C. In this way, the item 28 can be carefully withdrawn and separated from the tray 22. The linear actuator 134 can move slowly enough so as not to disturb the item 28, such as causing it to roll or pitch. Also, the foam 139 can cushion or cradle the item 28, as it is lowered, helping to prevent the item 28 from rolling or repositioning as it is withdrawn from the tray 22.

At step 314, the process includes rotating the flip arm, with the tray secured to the flip arm, back to the first position shown in FIG. 3A. For example, the item handling engine 220 can direct the drive system 100C to rotate the flip arm 100A, with the tray 22 secured to the flip arm 100A by the adhesion tool 115, back to the upright position over the conveyor system 20, similar to that shown in FIG. 3A. In this process, the item handling engine 220 removes the tray 22 from over the item 28, leaving the item 28 resting upon the tamper plate 138.

At step 316, the process includes disengaging the adhesion tool to release the tray from the flip arm. For example, the item handling engine 220 can control the adhesion tool 115 to release the tray 22, so that it can continue along the conveyor system 20.

At step 318, the process includes capturing an image of the item on the tamper plate. For example, the image processor 224 can direct the camera 51 to capture images of the item 28, as the item 28 is resting on the tamper plate 138. Because images were also captured by the camera 50 before the item 28 was flipped over, images of the item 28 can be captured from all sides of the item 28. In other words, a full examination of the item 28 can be conducted using the cameras 50 and 51, among possibly others, with the assistance of the tray flipper 100. The tray flipper 100 can also be relied upon to assist with other materials handling tasks, such as manipulating items (e.g., turning items over), repositioning items, and inspecting items.

At step 320, the process includes tilting the tamper plate of the tray flipper. Here, the item handling engine 220 can direct the extension arm 136 to retract or pull a certain length, which pivots the tamper plate 138. Thus, the tamper plate 138 can tilt, as shown in FIG. 3E, based on retraction by the extension arm 136. The item 28 can then slide off of the foam 139 and the tamper plate 138. The item 28 can slide into another tray, a chute, or another item handling system for further examination, transport, consolidation, or other handling processes.

Figure 6:
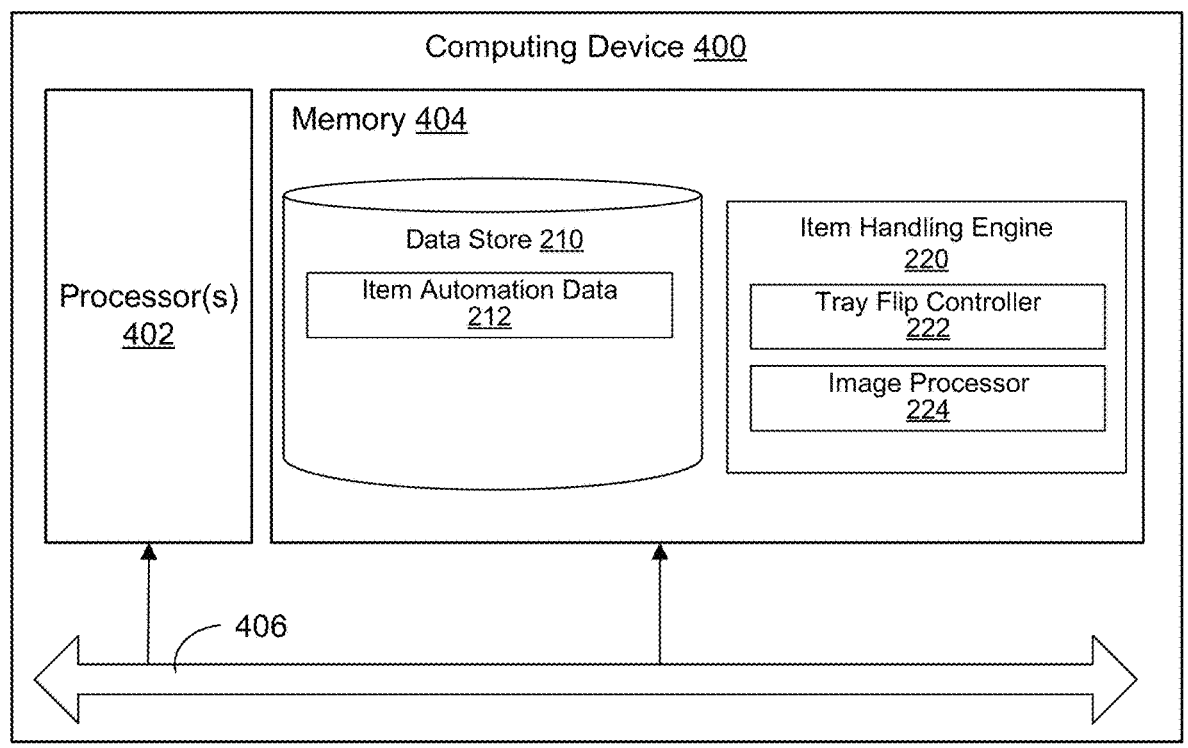
FIG. 6 illustrates an example computing device for any of the example tray flippers according to various aspects of the embodiments of the present disclosure.

FIG. 6 illustrates an example computing device 400 for the tray flipper 100 according to various aspects of the embodiments of the present disclosure. The control environment 200, as shown in FIG. 2, can be implemented in the computing device 400, using hardware, software, or a combination of hardware and software. As shown in FIG. 6, the computing device 400 includes at least one processing system, for example, having a processor 402 and a memory 404, both of which are electrically and communicatively coupled to a local interface 406. The local interface 406 can be embodied as a data bus with an accompanying address/control bus or other addressing, control, and/or command lines, for data communications and addressing between the processor 402, the memory 404, the tray flipper 100, the sensors 100D, and other peripherals and systems.

In various embodiments, the memory 404 stores the item automation data 212 and other software or executable-code components executable by the processor 402. The memory 404 can store data related to the operation of the tray flipper 100, the sensors 100D, and other data in the data store 210. Among others, the executable-code components can include components associated with the item handling engine 220 and an operating system for execution by the processor 402. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 404 stores software for execution by the processor 402. In this respect, the terms "executable" or "for execution" refer to software forms that can ultimately be run or executed by the processor 402, whether in source, object, machine, or other form. Examples of executable programs include, for example, a compiled program that can be translated into a machine code format and loaded into a random access portion of the memory 404 and executed by the processor 402, source code that can be expressed in an object code format and loaded into a random access portion of the memory 404 and executed by the processor 402, or source code that can be interpreted by another executable program to generate instructions in a random access portion of the memory 404 and executed by the processor 402.

In various embodiments, the memory 404 can include both volatile and nonvolatile memory and data storage components. Volatile components are those that do not retain data values upon loss of power. Nonvolatile components are those that retain data upon a loss of power. Thus, the memory 404 can include, a random access memory (RAM), read-only memory (ROM), magnetic or other hard disk drive, solid-state or semiconductor memory, a universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 404.

The processor 402 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the item handling engine 220 can represent a module or group of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. Thus, the processor 402 can be directed by execution of the program instructions to perform certain processes, such as those illustrated in FIG. 5. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 402. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowchart or process diagram in FIG. 5 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 402. The machine code can be converted from the source code, etc. Further, each block can represent, or be connected with, a circuit or a number of interconnected circuits to implement a certain logical function or process step.

Although the flowchart or process diagram in FIG. 5 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. In other words, the embodiments of the frame described herein are not limited to frame structures for aircraft, however, and may be relied upon as frame structures for both airborne and ground-based crafts, vehicles, etc. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A system for inverting a tray, comprising:
    a conveyor; and
    a tray flipper positioned along the conveyor, the tray flipper comprising:
        a flip arm positioned to nest between rollers of the conveyor, the flip arm comprising an adhesion tool;
        a tamper arm, the tamper arm comprising a tamper plate and a tamper actuator;
        a drive system mechanically coupled to pivot mounts for the flip arm and the tamper arm; and
        a controller configured to:
            detect alignment of the tray on the conveyor with the flip arm;
            direct the drive system to rotate the tamper arm to a position over the tray;
            actuate the tamper arm to secure contents in the tray;
            engage the adhesion tool to secure the tray with the flip arm;
            direct the drive system to rotate the tamper arm and the flip arm together, with the tray secured between the tamper arm and the flip arm, to an inverted position off of the conveyor; and
            direct the drive system to rotate the flip arm, with the tray secured to the flip arm, back to a position nested between the rollers of the conveyor.

2. The system according to claim 1, wherein:
    the system for inverting the tray further comprises a camera system; and
    the controller is further configured to capture a first image of the contents in the tray and a second image of the contents on the tamper arm.

3. The system according to claim 1, wherein the tamper actuator comprises a linear actuator configured to extend the tamper plate in a linear direction.

4. The system according to claim 1, wherein:
    the flip arm comprises a first support arm that extends in a first direction, a second support arm that extends in the first direction, and a bumper bar that extends in a second direction substantially perpendicular to the first direction; and
    the first support arm nests between the rollers of the conveyor at a position such that a clearance exists between a top surface of the first support arm and a top surface of the rollers of the conveyor.

5. A materials handling automation tool, comprising:
a flip arm and a tamper arm;
a drive system mechanically coupled to pivot mounts for the flip arm and the tamper arm; and
a controller configured to:
direct the drive system to rotate the tamper arm to a first position over the flip arm;
direct the drive system to rotate the tamper arm and the flip arm, together, to a second position; and
direct the drive system to rotate the flip arm, without the tamper arm, back to the first position.

6. The automation tool according to claim 5, wherein the flip arm comprises a first carriage arm that extends in a first direction, a second carriage arm that extends in the first direction, and a cross-bumper bar that extends in a second direction substantially perpendicular to the first direction.

7. The automation tool according to claim 5, wherein the flip arm comprises an adhesion tool secured to the flip arm, the adhesion tool comprising a vacuum cup capable of selectively adhering to a surface of a bin or tray.

8. The automation tool according to claim 5, wherein:
the flip arm is mechanically coupled to the drive system and a pivot mount for the flip arm; and
the drive system is capable of rotating the flip arm about a pivot axis established by the drive system and the pivot mount for the flip arm.

9. The automation tool according to claim 5, wherein the tamper arm further comprises a support leg, a linear actuator secured to the support leg, and a tamper plate secured to an end of the linear actuator.

10. The automation tool according to claim 5, wherein the tamper arm further comprises a tamper plate and a layer of foam positioned on a surface of the tamper plate.

11. The automation tool according to claim 5, wherein:
the tamper arm is mechanically coupled to the drive system and a pivot mount for the tamper arm; and
the drive system is capable of rotating the tamper arm about a pivot axis established by the drive system and the pivot mount for the tamper arm.

12. The automation tool according to claim 5, wherein the drive system comprises a first drive mechanism to rotate the flip arm and a second drive mechanism to rotate the tamper arm.

13. The automation tool according to claim 5, wherein the controller is further configured to:
detect alignment of a tray with the flip arm; and
engage an adhesion tool to secure the tray with the flip arm.

14. The automation tool according to claim 5, wherein the controller is further configured to extend a tamper plate of the tamper arm into a tray positioned between the flip arm and the tamper arm, before the drive system is directed to rotate the tamper arm and the flip arm to the second position.

15. The automation tool according to claim 5, wherein the controller is further configured to retract a tamper plate of the tamper arm out from a tray positioned between the flip arm and the tamper arm, before the drive system is directed to rotate the flip arm, without the tamper arm, back to the first position.

16. A method for inverting a tray, comprising:
rotating a tamper arm to a first position over the tray and a flip arm;
actuating the tamper arm to extend a tamper plate into the tray, to secure contents in the tray;
rotating the tamper arm and the flip arm together, with the tray secured between the tamper arm and the flip arm, to a second position; and
rotating the flip arm, with the tray secured to the flip arm, back to the first position.

17. The method of claim 16, further comprising engaging an adhesion tool to secure the tray with the flip arm before rotating the tamper arm and the flip arm to the second position.

18. The method of claim 16, further comprising actuating the tamper arm to retract the tamper plate from the tray, with the contents from the tray resting on the tamper plate, after rotating the tamper arm and the flip arm to the second position.

19. The method of claim 16, further comprising disengaging an adhesion tool to release the tray from the flip arm after rotating the flip arm back to the first position.

20. The method of claim 16, further comprising:
capturing a first image of the contents in the tray before rotating the tamper arm and the flip arm to the second position; and
capturing a second image of the contents from the tray on the tamper plate after rotating the flip arm back to the second position.

* * * * *